United States Patent [19]

Barrett et al.

[11] Patent Number: 5,457,590

[45] Date of Patent: * Oct. 10, 1995

[54] INSERTABLE ELEMENT FOR A DISK STATION OF EDP EQUIPMENT WITH CONNECTIONS TO EXTERNAL COMPONENTS

[75] Inventors: Paul Barrett, Worcester Park, United Kingdom; Raymund Eisele, Idstein, Germany

[73] Assignee: SmartDiskette GmbH, Idstein, Germany

[ * ] Notice: The portion of the term of this patent subsequent to Oct. 27, 2009 has been disclaimed.

[21] Appl. No.: 712,897

[22] Filed: Jun. 11, 1991

Related U.S. Application Data

[63] Continuation-in-part of Ser. No. 448,093, Dec. 12, 1989.

[30] Foreign Application Priority Data

Jun. 11, 1990 [DE] Germany ............... 40 21 199.1

[51] Int. Cl.⁶ ............... G11B 23/03; G06K 19/06; G06F 13/00
[52] U.S. Cl. ............... 360/133; 235/492; 395/280; 360/137
[58] Field of Search ............... 360/133, 132, 360/137; 235/492; 364/708; 395/325

[56] References Cited

U.S. PATENT DOCUMENTS

| | | | |
|---|---|---|---|
| 3,700,826 | 10/1972 | O'Neal | 360/137 |
| 3,940,758 | 2/1976 | Margolin | 340/337 |
| 3,946,156 | 3/1976 | Budrose | 360/137 |
| 3,978,524 | 8/1976 | Gordon et al. | 360/137 |
| 4,034,164 | 7/1977 | Westmoland | 360/137 |
| 4,228,474 | 10/1980 | Neal, Jr. | 360/137 |
| 4,504,871 | 3/1985 | Berwick et al. | 360/31 |
| 4,701,601 | 10/1987 | Francini et al. | 235/449 |
| 4,734,897 | 3/1988 | Schotz | 360/137 |
| 4,755,883 | 7/1988 | Uehira | 360/137 |
| 4,769,764 | 9/1988 | Levanon | 364/708 |

(List continued on next page.)

FOREIGN PATENT DOCUMENTS

| | | |
|---|---|---|
| 0178805 | 4/1986 | European Pat. Off. . |
| 0373411 | 6/1990 | European Pat. Off. . |
| 3528199 | 2/1987 | Germany . |
| 8709268.9 | 10/1987 | Germany . |
| 664635 | 3/1988 | U.S.S.R. . |
| WO90/04847 | 5/1990 | WIPO . |

OTHER PUBLICATIONS

"Personal Transaction Card" IBM Technical Disclosure Bulletin, vol. 30, No. 3, Aug. 1987, pp. 1262–1265.

"Transaction Handling System Using A Bank Card With Display, Input and Memory Functions" IBM Technical Disclosure Bulletin, vol. 28, No. 6, Nov. 1985, pp. 2568–2570.

"Stiffened Card With Integrated Circuit" IBM Technical Disclosure Bulletin, vol. 28, No. 11, Apr. 1986, pp.

(List continued on next page.)

*Primary Examiner*—A. J. Heinz
*Assistant Examiner*—Jefferson Evans
*Attorney, Agent, or Firm*—Spencer, Frank & Schneider; Christopher H. Lynt

[57] ABSTRACT

An insertable element for the diskette or cassette station of a piece of electronic data processing equipment having an interface. The arrangement is such that data transmission between the EDP equipment and the element can be carried out through write/read devices which already exist in the EDP equipment. The element has a component which, in the inserted condition, is outside of the EDP equipment and itself is comprised of the EDP components and/or of the EDP devices and/or is constructed as a device to connect further EDP devices. According to another feature, a process for operating the EDP device with this insertable element is carried in such a way that the entire PC operating system and further programs are stored and at the commencement are loaded from there.

12 Claims, 4 Drawing Sheets

U.S. PATENT DOCUMENTS

| | | | |
|---|---|---|---|
| 4,774,618 | 9/1988 | Raviv | 360/133 |
| 4,791,283 | 12/1988 | Burkhardt | 235/438 |
| 4,814,924 | 3/1989 | Ozeki | 360/133 |
| 4,860,128 | 8/1989 | Nakagawa | 360/133 |
| 4,965,691 | 10/1990 | Iftikar et al. | 360/133 |
| 5,044,798 | 9/1991 | Roylance et al. | 400/472 |
| 5,050,020 | 9/1991 | Campbell et al. | 360/92 |
| 5,055,947 | 10/1991 | Satoh | 360/137 |
| 5,159,182 | 10/1992 | Eisele | 360/137 |
| 5,224,216 | 6/1993 | Gordon et al. | 360/133 |
| 5,237,551 | 8/1993 | Ogawa et al. | 369/54 |
| 5,321,817 | 6/1994 | Feinstein | 395/325 |
| 5,338,923 | 8/1994 | Grieu | 235/492 |

OTHER PUBLICATIONS

4723–4725.

"IC–Cards–Neue Aspekte der Informationsverarbeitung" Datentechnik, Electronik 19/19.9 1986, pp. 99–101.

INSERTABLE ELEMENT FOR A DISK STATION OF EDP EQUIPMENT WITH CONNECTIONS TO EXTERNAL COMPONENTS

CROSS REFERENCE TO RELATED APPLICATIONS

This application is a continuation-in-part of application Ser. No. 07/448,093, filed Dec. 12th, 1989.

BACKGROUND OF THE INVENTION

From the earlier European patent application 89121870.3, an insertable element which is constructed as a diskette and is equipped with a special interface is known for EDP equipment. The interface is constructed so that a data transmission can be carried out between a processor which is on the diskette, and read/write devices which are present in the EDP equipment. The particular advantage connected with these features is that a data exchange between the processor of the diskette and the EDP equipment is feasible without the need of additional interfaces.

SUMMARY OF THE INVENTION

The object of this invention is to increase the possible applications for the insertable element.

This object is achieved in that when the insertable element (diskette) of the present invention is inserted into the disk station of EDP equipment, there is an external component which is outside of the EDP equipment. This external component may be comprised of EDP components (processor, storage and the like) and/or of EDP devices and/or is constructed as a device to connect further EDP devices.

The advantage of this configuration is that the EDP components contained in the external component can have larger dimensions than the ones used in a fully insertable element. Independent EDP devices (e.g. a modem) could also be accommodated in the external component. The feasibility of connecting further EDP devices to the insertable element or to the external component permits a data communication by the EDP component contained in the insertable element and/or the external component, not only with the host system into which the insertable element is inserted, but also with EDP components of the EDP equipment connected to the external component; moreover, a direct or indirect (controlled) communication connection between the connected EDP devices and the host system can be established. Operating elements (keyboard, display and the like) can also be contained on the external component, so that the operating elements are visible and can be manipulated even when the insertable element is inserted into the disk station of the EDP equipment.

The external component can be pulled or folded out from the insertable element. The communication between the insertable element and the external component takes place through a communication link using cable, radio waves, infrared, microwaves or the like. In addition to the display, the external component may have a keyboard, a read/write device for chip-cards (also referred to as IC cards), one or more batteries, a modem with an extended cable leading from the external component to a telephone line for example.

A cable can also be used which is connected directly with the processor and leads from the external component, to connect external devices, e.g., streaming tape, local area network (LAN), voice input and output, or another element for the purpose of data exchange.

The modem or the processor could also be directly integrated into the insertable element. In this case, the external component is a cable leading from the insertable element, which can be connected with further EDP devices.

Furthermore, the insertable element can be provided with an additional storage with a magnitude of several megabytes to store data and programs.

In a typical application, chip-cards are inserted into a chip-card read/write device (with or without keyboard), which is connected by a cable with a communication device of an EDP device. The disadvantage is that the chip-card read/write device is not only expensive (they must be specially security protected, because they are generally accessible), but also requires a communication device on a personal computer (PC). Their use in connection with laptop PCs is also a problem, as the chip-card read/write device has to also be carried by the user. Furthermore, the contents of a chip-card can only be read through such devices.

Modems are usually used for the transmission of data through telephone lines. However, most PCs have no built-in modems, consequently external modems have to be used. An external modem is connected through a communication device (if there is room for it) in the PC. In the case of laptop PCs, for example, this is a complication in that the PC and the modem both must be transported.

To back up data from a hard disk of a PC to a magnetic tape, a streaming tape device is usually connected through the communication device of the PC. These communication devices normally have a data flow rate of 19,200 bps maximum. This means that it takes approximately 5 hours to back up a 40 MB hard disk. PCs can be also connected to each other or with other external units over a conventional communication device. The data flow rate, however, is the limiting factor.

Typically, a maximum of 1.4 MB can be stored on a 3 ½" diskette. This means that several diskettes are required to store the data of a hard disk. Therefore, important data, which must be secured, is stored either on (expensive) removable disks, or on several 3½" diskettes, to enable their safekeeping in a safe.

According to this invention, the external component may be pulled or folded out of the insertable element and is connected to the insertable element by a cable or through radiowaves, infrared, or microwaves. The external component may contain a display, a keyboard, and a read/write device for chip-cards. It also can be easily handled and a user can communicate with a chip-card inserted into the external component. Thus, a small and portable device will be available, by which one can exchange information between a PC and a chip-card.

Furthermore, when data is to be exchanged between a PC and a chip-card, this can be carried out conveniently by using the expanded insertable element with each PC (also with laptop PCs). This is a particular advantage when battery-operated laptop PCs are used outside the workplace, where normally no communication port is available to connect a chip-card write/read device.

Due to the fact that a modem is integrated in the insertable element or in the external component, data can be exchanged without great effort from any place with another EDP device through the telephone line, as long as a telephone access socket (TAE) port is available.

Normally, PC disk stations work with a data transmission rate of 500 kbps. By using the insertable element with the magnetic interface and a cable leading from the insertable element, one can communicate with external units at this data transmission rate. This is advantageous when data has to be stored from the hard disk to a streaming tape or copied back from tape to disk. A further advantage is that an insertable element can be transported conveniently from one PC to another one when, for example, back-up copies have to be made from several PCs.

This high data transmission rate is further required when using speech input/output devices and when connecting a LAN. If, for example, two PCs are connected with each other (to copy data from one laptop PC to another laptop PC) this can be carried out very conveniently and quickly with an insertable element. For this purpose, a correspondingly equipped insertable element is inserted into each PC, the insertable elements are connected to each other through cables leading from the elements, and a data exchange can take place at a speed of up to 500 kbps.

The insertable element, embodied as a RAM disk with an additional storage of several megabytes (approximately 40 MB) is extremely well suited to make back-up copies on one or more insertable elements from a hard disk at a high speed (500 kbps). The operator also can avoid loading of important data onto the hard disk in the first place by simply keeping the data on the insertable element and modifying, extending or deleting the data there.

If important data is kept on the hard disk, it is sometimes encoded for security reasons. This, however, is of little value if the PC is stolen together with the hard disk. Although, the data cannot be read by the thief if it is well encoded, the rightful owner has no access to it either. By using the insertable element, the data, when not needed, can always be locked in a safe requiring little space or the owner can even carry it on his person.

The additional storage, not only of the insertable element but also of other embodiments, can be used, for example, to store the entire PC operating system and further programs. To use a PC, after the input of the secret code, the insertable element is inserted into the disk slot. When booting up, the operating system and then further programs (e.g. a PC protection program) is to be read first into the main memory. The advantage of this scheme is that viruses, which are in the PC (e.g. in the boot sector), are not activated at all. By using a PC protection system located on the insertable element, it can also be ensured that only programs and data which are not subject to illegal modification will be processed.

BRIEF DESCRIPTION OF THE DRAWINGS

The advantages, details and applications of the described invention are explained based on embodiments schematically illustrated in the following drawings.

DETAILED DESCRIPTION OF THE PREFERRED EMBODIMENTS

Figure 1:
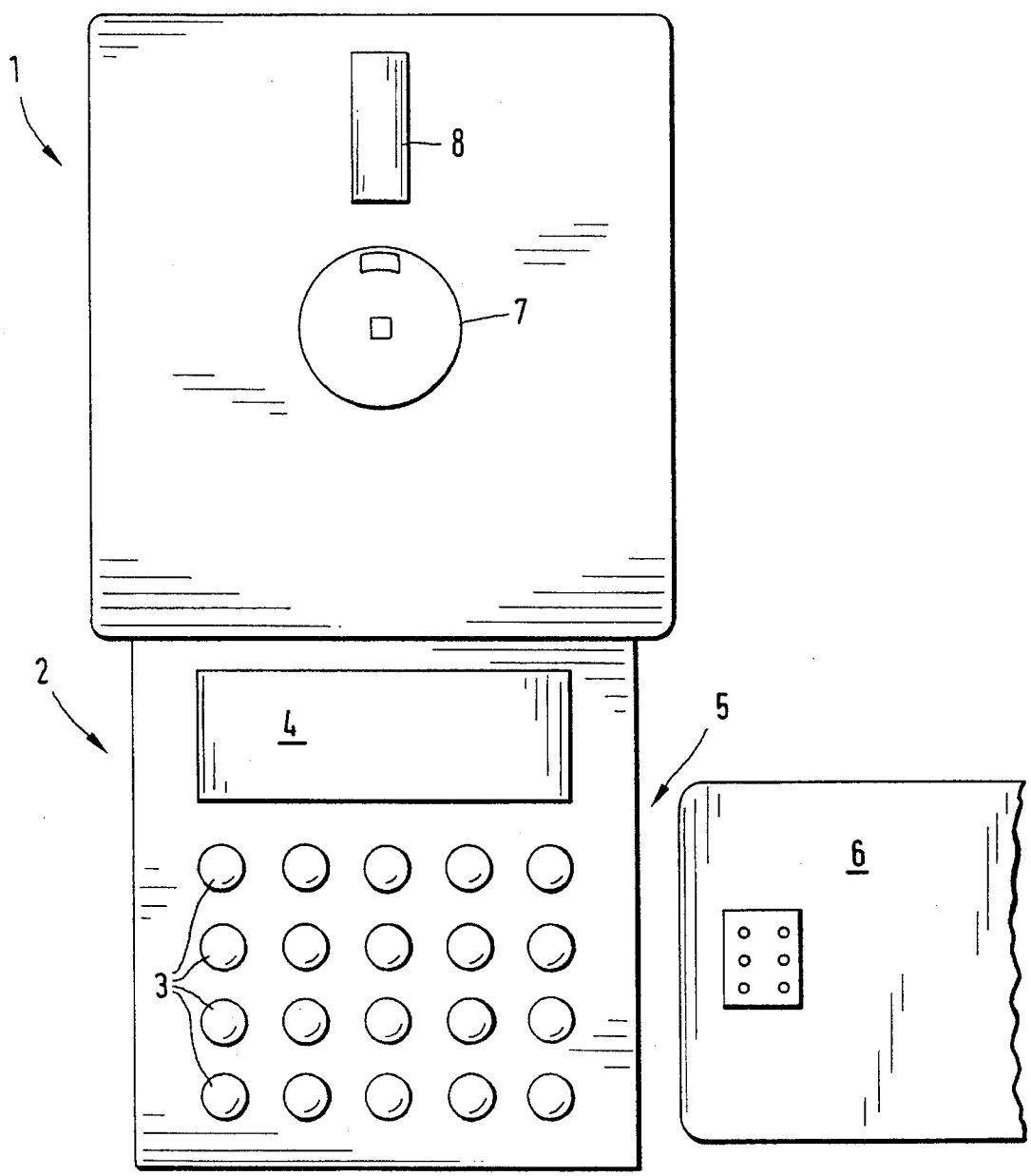
FIG. 1 is a top view of an insertable element with an external component which can be pulled or folded out, which in addition to the display also has a keyboard and a device to read and write chip-cards.
Figure 2:
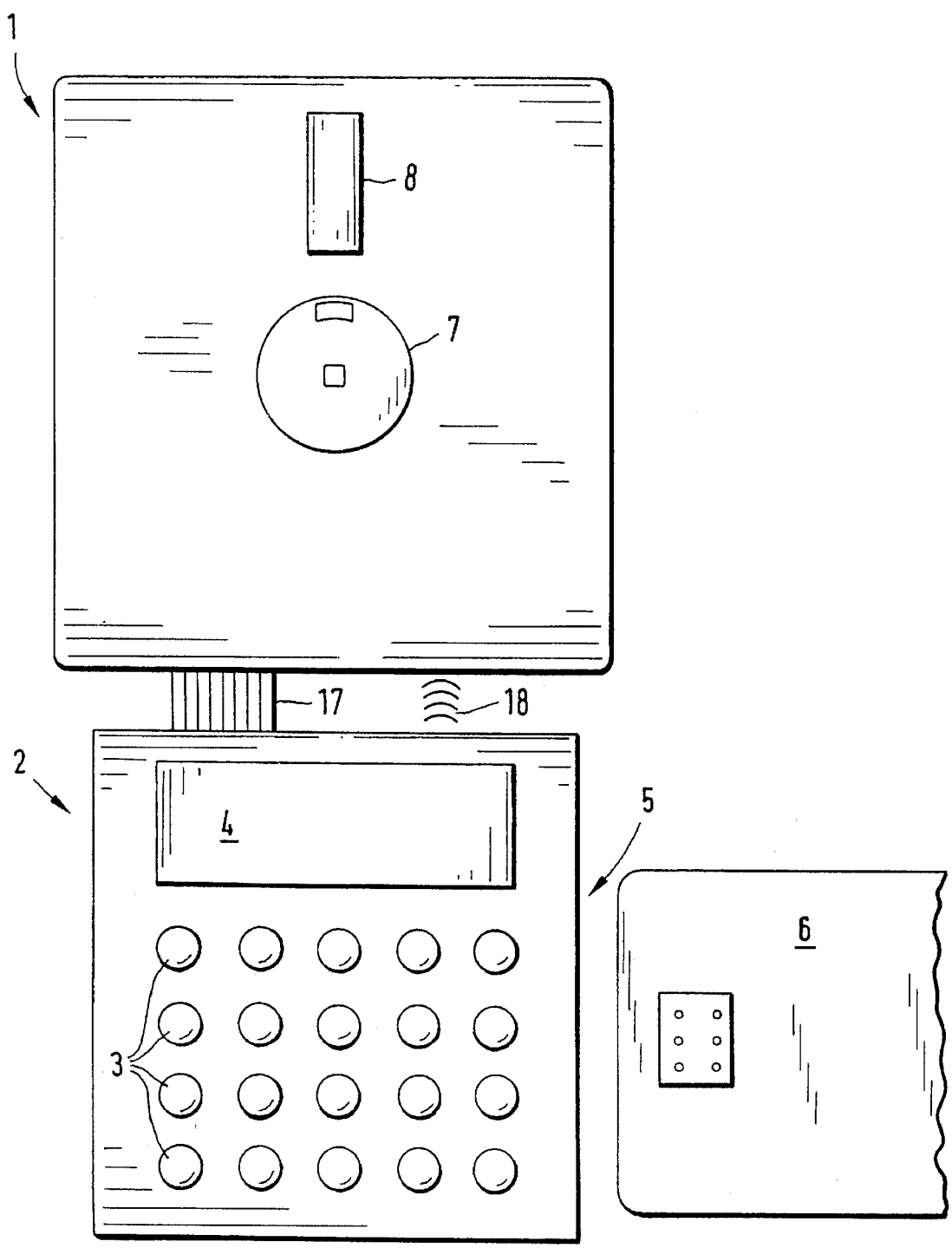
FIG. 2 is a top view of an insertable element with an external component, which in addition to the display also has a keyboard and a device to read and write chip-cards, and which is connected through a cable or radiowaves, infrared, microwaves with the element which can be inserted into the EDP devices.

The insertable elements 1 illustrated in FIGS. 1 and 2 are expanded by an external component 2, which is equipped with a keyboard 3, a display 4, a chip-card read/write device 5, into which a chip-card 6 can be inserted. The external component 2 can be pulled out from the insertable element 1. The insertable element 1 is basically constructed as it is described in the earlier European patent application 89121870.3. Only a rotor 7, which can be the component of a current generator, and the special interface 8 are schematically illustrated. Optionally the insertable element 1 of the external component 2 are furnished with one or more batteries 9 (cf. FIGS. 3 and 4).

In the embodiments according to FIGS. 1 and 2, when the chip-card 6 is inserted into the read/write device 5, information (e.g. personal identification number=PIN) can be entered into the chip-card 6 by means of the keyboard 3 or information from the chip-card 6 can be displayed on the display 4. Furthermore, over the magnetic interface 8 of the insertable element 1 and the disk station, data can be exchanged between the PC and the chip-card 6.

In the embodiment according to FIG. 2, the external component 2 communicates with the insertable element 1 either through a cable 17 or through radiowaves, infrared or microwaves 18. This embodiment has the advantage that the external component 2 can be conveniently operated and the display can be easily read even when the insertable element 1 is inserted into the disk station of the PC. For example, when an electronic signature is to be produced on the insertable element, the user can view the values which have to be signed on the display 4 and, if he wishes to do so, release these through the keyboard 3 to produce the signature. Thus, only the values which have been seen and released by the user are signed.

Figure 3:
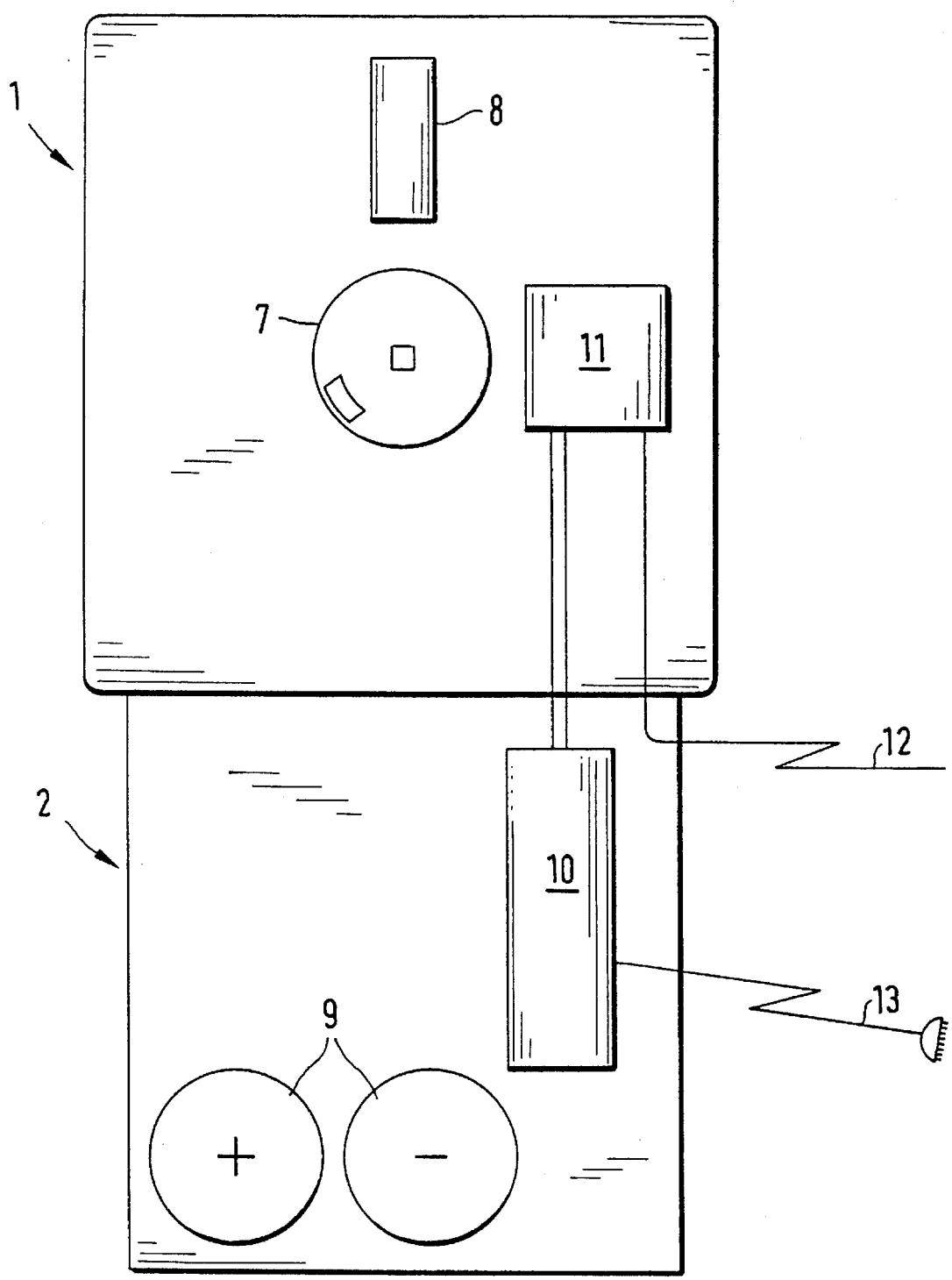
FIG. 3 is a top view of an insertable element according to the invention with a modem situated in the expansion component as well as cables leading from it, which are connected with the modem and/or the processor.
Figure 4:
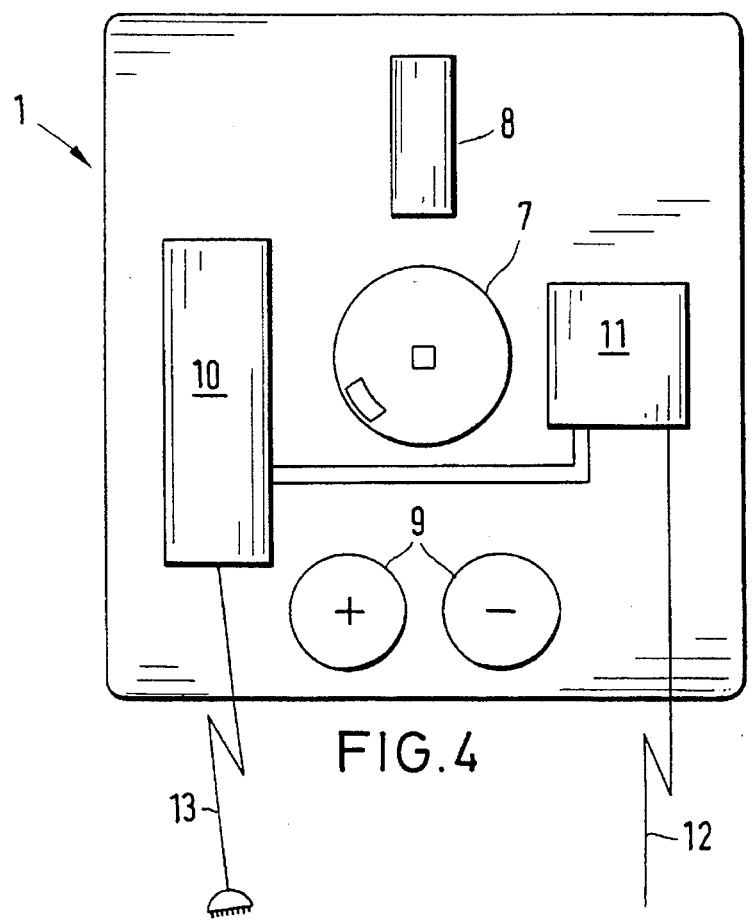
FIG. 4 is a top view of an insertable element with an integrated modem which is connected with a cable leading from it, as well as another cable leading from it, which is connected directly with the processor.

The insertable element 1, 2 illustrated in FIGS. 3 and 4 contains, besides the processor 11, a modem 10 which is integrated in the insertable element 1 or in the external component 2, which with a cable 13 (V.24/V.35/TEA) leading from it is connected to the telephone network, for example, for the purpose of data transmission. Furthermore, an outward leading cable 12 (V.24/V.35/coaxial, twinax) is illustrated, which is connected directly to the processor 11. Through the disk station, the magnetic interface of the insertable element, the processor 11 and the cable 12, data can be exchanged between a PC and external devices, like a streaming tape, at a throughput rate of approximately 500 kbps.

Figure 5:
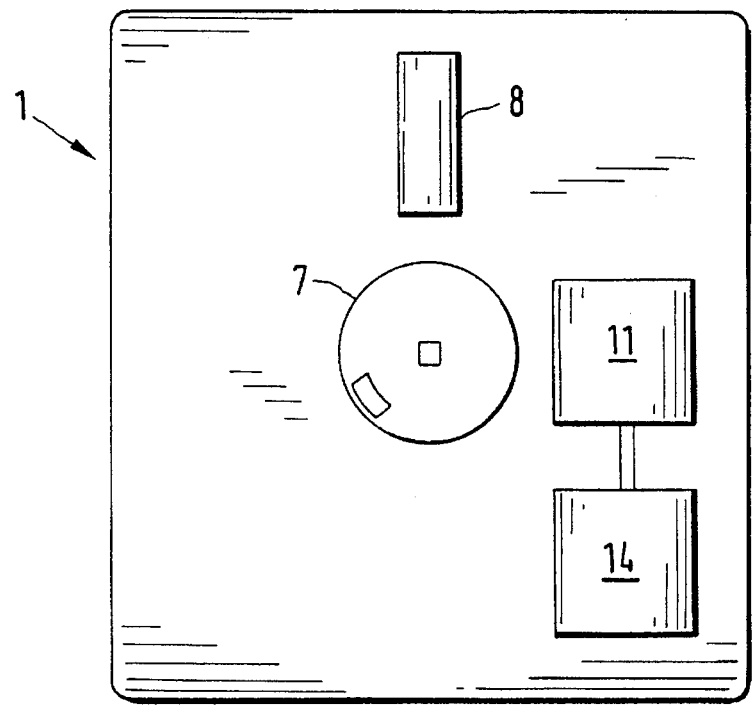
FIG. 5 is a top view of an insertable element with an additional storage of several megabytes.

The insertable element 1, illustrated in FIG. 5, besides the processor 11 and the further devices (not illustrated here) contains an additional storage 14 with a capacity of several magabytes, which can be used with a speed of approximately 500 kbps to back up data stored on a hard disk. Furthermore, the additional storage 14 can be used for storing important data in the smallest possible space and to modify, delete or extend the data without loading it on the hard disk.

From the following list the multitude of possible applications of an insertable element constructed in accordance with the invention will become obvious together with the associated advantages.

Possible applications include:

Read/write device for chip-cards

PIN input through keyboard

Display of information

Communication between user and chip-cards

Communication between the chip-card and the PC

Remote data transmission over integrated modem and telephone cable leading from the modem Data exchange with external devices, like streaming tape, optical disk storage, other PCs, etc.

Unlimited storage space (many megabytes)

Co-processor (size irrelevant, does not depend on the thickness of the diskette)

Integrated speech input/output

Advantages include:

Can be used on every PC and on every work station with 3½" drive

Can be inserted in laptops and notebooks

Independent from the PC's capacity and operating system

Independent from the available interfaces and slots in the PC

Independent from the recording density of the disk drive

No problems regarding standardization, standardized interfaces are already available No hardware installation expenses High rate of data flow (approximately 500 kbit)

Saves space and is portable

Large storage capacity (many megabytes).

We claim:

1. In a data security system which includes an insertable data security element for a disk station of a host electronic data processing (EDP) equipment including read/write devices, wherein the insertable data security element includes interface means for transmitting data between the insertable data security element and the host EDP equipment through the read/write devices, an improvement comprising:

external component means coupled to said insertable data security element and located outside of the host EDP equipment when said insertable data security element is inserted in the disk station of the host EDP equipment, said external component means for connecting at least one external EDP device to the host EDP equipment by way of the interface means of said insertable data security element; and a microprocessor coupled to the interface of said insertable data security element and mounted on said insertable data security element, said microprocessor for actively con-trolling data communication between the host EDP equipment and the at least one external EDP device and providing data security using a protection program on the insertable data security element, whereby only authorized programs and data will be processed by the host EDP equipment.

2. In a data security system which includes an insertable data security element for a disk station of a host electronic data processing (EDP) equipment including read/write devices, wherein the insertable data security element includes interface means for transmitting data between the insertable data security element and the host EDP equipment through the read/write devices, an improvement comprising:

external component means coupled to said insertable data security element and located outside of the host EDP equipment when said insertable data security element is inserted in the disk station of the host EDP equipment, said external component means for connecting at least one external EDP device to the host EDP equipment by way of the interface of said insertable data security element, said external component means including a microprocessor for actively controlling data communication between the host EDP equipment and the at least one external EDP device and providing data security using a protection program on the insertable data security element, whereby only authorized programs and data will be processed by the host EDP equipment; and means connecting said external component means to said insertable data security element for one of pulling and folding out said external component means from said insertable data security element.

3. In a data security system which includes an insertable data security element for a disk station of a host electronic data processing (EDP) equipment including read/write devices, wherein the insertable data security element includes interface means for transmitting data between the insertable data security element and the host EDP equipment through the read/write devices, an improvement comprising:

external component means coupled to said insertable data security element and located outside of the host EDP equipment when said insertable data security element is inserted in the disk station of the host EDP equipment, said external component means for connecting at least one external EDP device to the host EDP equipment by way of the interface of said insertable data security element;

a microprocessor coupled to the interface and located on said insertable data security element, said microprocessor for actively controlling data communication between the host EDP equipment and the at least one external EDP device and providing data security using a protection program on the insertable data security element, whereby only authorized programs and data will be processed by the host EDP equipment;

a modem mounted on one of the insertable data security element and the external component means and coupled to said microprocessor; and a cable connected to said modem for transmitting data between the microprocessor and the at least one external EDP device through the modem.

4. In a data security system which includes an insertable data security element for a disk station of a host electronic data processing (EDP) equipment including read/write devices, wherein the insertable data security element includes interface means for transmitting data between the insertable data security element and the host EDP equipment through the read/write devices, an improvement comprising:

external component means coupled to said insertable data security element and located outside of the host EDP equipment when said insertable data security element is inserted in the disk station of the host EDP equipment, said external component means for connecting at least one external EDP device to the host EDP equipment by way of the interface of said insertable data security element, wherein said insertable data security element includes a microprocessor coupled to the interface, for actively controlling data communication between the host EDP equipment and the at least one external EDP device and providing data security using a protection program on the insertable data security element, whereby only authorized programs and data will be processed by the host EDP equipment, and a cable connected to the microprocessor for transmitting data between the microprocessor and the at least one external EDP device.

5. In a data security system which includes an insertable data security element for a disk station of a host electronic data processing (EDP) equipment including read/write devices, wherein the insertable data security element includes interface means for transmitting data between the insertable data security element and the host EDP equipment through the read/write devices, an improvement comprising:

external component means coupled to said insertable data security element and located outside of the host EDP equipment when said insertable data security element is inserted in the disk station of the host EDP equipment, said external component means for connecting at least one external EDP device to the host EDP equipment by way of the interface of said insertable data security element, wherein said external component means includes a chip-card read/write device and a microprocessor for transmitting data between an external chip-card to the host EDP equipment and the host EDP equipment the data communication being actively controlled by the microprocessor and providing data security using a protection program on the insertable data security element, whereby only authorized programs and data will be processed by the host EDP equipment.

6. In a data security system which includes an insertable data security element for a disk station of host EDP equipment including read/write devices, wherein the insertable data security element includes interface means for transmitting data between the insertable data security element and the host EDP equipment through the read/write devices, said data security system further comprising:

storage means coupled to said interface and having a storage capacity greater than one megabyte; and a microprocessor coupled to said storage means, said microprocessor for actively controlling data transmission between said host EDP equipment and said storage means through said interface and providing data security using a protection program on the insertable data security element, whereby only authorized programs and data will be processed by the host EDP equipment.

7. The a data security system according to claim 6, wherein said storage means and said microprocessor are both located on said insertable data security element.

8. The a data security system according to claim 6, and further comprising an external component means coupled to said insertable data security element, wherein said storage means is located on one of said external component means and said insertable data security element, and wherein said microprocessor is located on one of said external component means and said insertable data security element.

9. The a data security system according to claim 6, wherein said storage means stores at least a portion of an operating system for the host EDP equipment which can be loaded into the host EDP equipment at a commencement of operations.

10. A method of operating the host EDP equipment including the a data security system according to claim 6, comprising:

storing at least one of an operating system and additional programs for the host EDP equipment in the storage means; and transferring at least one of the operating system and additional programs from the storage means to the host EDP equipment when required by the host EDP equipment during operation.

11. A method of operating the host EDP equipment wherein the host EDP equipment includes a hard disk and the a data security system according to claim 6, comprising:

transferring data from the hard disk of the host EDP equipment to the storage means to produce a back-up copy.

12. A method of operating the host EDP equipment wherein the host EDP equipment includes a hard disk and the a data security system according to claim 6, comprising:

storing, deleting, or modifying data for the host EDP equipment directly on the storage means without first loading the data on the hard disk of the host EDP equipment.

* * * * *